Sept. 12, 1939.     L. C. SLINE     2,172,522
SAFETY BREATHER FOR AIRCRAFT ENGINES
Filed March 24, 1938
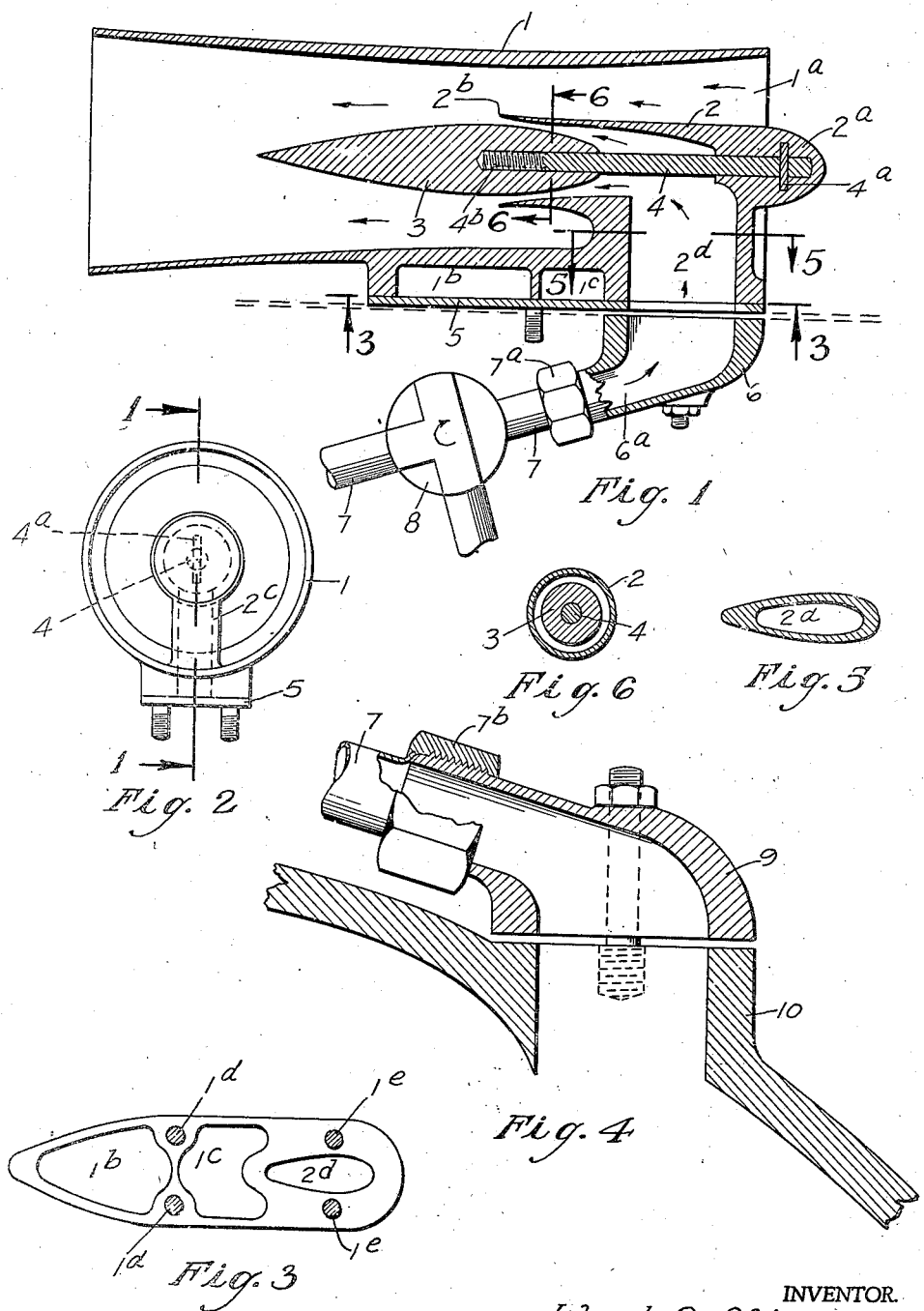
INVENTOR.
Lloyd C. Sline
BY A. B. Bowman
ATTORNEY.

Patented Sept. 12, 1939

2,172,522

UNITED STATES PATENT OFFICE 2,172,522

SAFETY BREATHER FOR AIRCRAFT ENGINES

Lloyd C. Sline, San Diego, Calif.

Application March 24, 1938, Serial No. 197,969

4 Claims. (Cl. 123—198)

My invention relates to an apparatus for producing a partial vacuum in the crank case of an engine particularly aircraft engines to prevent the rapid dissipation of oil in case of a leak in the crank case or its communicating auxiliaries and the objects of my invention are:

First, to provide an apparatus to be positioned on the leading side of an aircraft in the form of a Venturi tube in connection with a jetting nozzle for drawing air from the crank case of the engine to create a partial vacuum therein;

Second, to provide an apparatus of this class which is operated by reason of the flow of air past the aircraft while in flight;

Third, to provide an apparatus of this class which will reduce to a minimum the leakage from the crank case in case of small breaks in the crank case or other connecting portions;

Fourth, to provide an apparatus of this class which will provide greater safety against forced landings in long distance flight particularly in connection with aircraft use for war purposes;

Fifth, to provide an apparatus of this class which may be used for detecting leaks in the crank case when the engine is not in use for driving the aircraft, thus facilitating the inspection of the engine;

Sixth, to provide an apparatus of this class which will reduce the quantity of oil necessary for proper lubrication of the engine by reducing the oil loss from the crank case;

Seventh, to provide an apparatus of this class which is applicable to and may be readily applied to various types of aircraft and their engine crank case;

Eighth, to provide an apparatus of this class in which the vacuum relation in the crank case may be adjusted and varied for various speeds and types of aircraft and their engine crank case relation; and Ninth, to provide an apparatus of this class which is very economical of operation, easy to install, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of the main portion of my apparatus showing some of the parts and portions in elevation to facilitate the illustration; Fig. 2 is a front elevational view of the Venturi casing forming the main portion of the operating portion of my apparatus; Fig. 3 is a bottom view taken from the line 3—3 of Fig. 1; Fig. 4 is a sectional view of a fragmentary portion of the breathing portion of an engine crank case showing a fragmentary portion of my connecting bracket in connection therewith shown on an enlarged scale from that of the other views; Fig. 5 is a sectional view taken from the line 5—5 of Fig. 1 and Fig. 6 another sectional view taken from the line 6—6 of Fig. 1.

Similar characters of reference refer to similar parts and portions throughout the several views of the drawing:

The Venturi casing 1, nozzle member 2, nozzle regulating member 3, nozzle regulating member support 4, supporting plate 5, inlet bracket 6, conducting tube 7, valve 8, breather connecting bracket 9, and engine crank case breather 10 constitute the principal parts and portions of my vacuum producing apparatus for aircraft engine crank case.

The engine crank case breather 10 is of any conventional form and applicant's apparatus may be connected with any type of engine crank case breather or may be connected with other special openings in connection with the engine crank case if desired, the one shown in Fig. 4 being a simple form of conventional type.

The Venturi casing 1 is in the form of a Venturi tube which has its minimum diameter intermediate its ends. It is provided centrally at its front end 1a with a nozzle member 2 which is provided with a protruding head 2a which extends slightly forwardly of the front edge of the main portion of the casing and extends backwardly to substantially the middle of the casing in cylindrical form with backwardly converging walls which increase in diameter to their rear ends 2b which are substantially thin edges as shown in Fig. 1 of the drawing, thus providing a central opening therein. This nozzle member 2 is supported in the casing by means of a stream-lined upwardly connected web member 2c which is provided with an opening 2d therein which extends downwardly past the lower side of the main portion of the casing 1 as shown best in Fig. 1 of the drawing.

Secured in the head portion 2a of the member 2 which is preferably molded or otherwise secured therein is a support member 4 which is provided with a cross support 4a near its front end for anchoring said member 4 in the head portion 2a of the nozzle 2. This member is in bolt form and extends backwardly to the open end of the nozzle and is provided with a threaded end 4b at its extended end.

Mounted on this member 4 is the nozzle regulating member 3 which is screw threaded on the threads 4b but extends forwardly some distance from the threaded portion 4b as shown best in Fig. 1 of the drawing. This member 3 is a stream-lined member with its front end forming an annular channel in the nozzle outlet of the member 2 as shown best in Fig. 1 of the drawing and extends backwardly some distance in pointed stream-lined form. This casing member 1 is provided with open portions 1b and 1c for making the casing lighter and secured on the lower side thereof is a plate 5. This plate 5 is adapted to be secured on the leading portion of the aircraft in any desirable position, preferably close to the breather portion of the engine crank case of the aircraft and is secured by means of lug bolts 1d and 1e. It may be secured over the metal covering shown in dash lines in Fig. 1 of the drawing. It will be here noted that the opening 2d into the nozzle 2 is of substantial stream-line shape as shown in Fig. 3 of the drawing, and connected thereto by means of the lugs 1e is the inlet bracket 6 which is also stream-lined and provided with a conforming opening to the opening 2d which gradually converges into a round opening at 6a for connection with a tube 7 by means of a nut 7a.

Mounted in this tube 7 is a valve 8 which is adapted to close the passage and at the same time connect with atmosphere. The other end of this tube 7 connects with the breather connecting bracket 9 by means of a nut 7b and the opening in this bracket 9 enlarges and conforms with the opening in the breather portion 10 of the crank case as shown in Fig. 4 of the drawing. This bracket 9 may be any shape or form desired to conform to the breathing portion of the crank case.

The operation of my vacuum producing apparatus for aircraft engine crank cases is substantially as follows:

When the aircraft is in flight air is forced through the tube 1 around the nozzle portion 2 passing over the thin edges 2b of the nozzle member 2 and inasmuch as the greatest velocity is substantially at this point, air is sufficiently drawn from the engine crank case through the bracket 9, tube 7, valve 8, bracket 6, opening 2d and out between the thin edges 2b and the member 3, thus providing a partial vacuum in the crank case of the engine causing air to come in through any openings in the crank case, thus preventing oil from passing out therethrough and reducing the oil leakage to a minimum.

It will be noted that the member 3 may be shifted forwardly or backwardly on the member 4 for adjusting the opening thus providing for a varying relation of the vacuum with the air passage as desired.

When the aircraft is on the ground leaks may be detected in the crank case by turning the valve 8 so that it communicates with atmosphere and closes conduit 6a. Then by operating the engine, the pressure in the crank case will disclose leakage in the crank case.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a safety breather for aircraft engines of the class described, a Venturi casing secured on the aircraft facing the direction of flight of said aircraft provided with an oppositely diverging walled channel therein, a nozzle member secured centrally therein at its front portion with its outlet extending backwardly, a conductor communicating with said nozzle and with the interior of the crank case of the engine, and a regulating member positioned in the outlet of said nozzle.

2. In a safety breather for aircraft engines of the class described, a Venturi casing secured on the aircraft facing the direction of flight of said aircraft provided with an oppositely diverging walled channel therein, a nozzle member secured centrally therein at its front portion with its outlet extending backwardly, a conductor communicating with said nozzle and with the interior of the crank case of the engine, a regulating member positioned in the outlet of said nozzle, said regulating member being stream-lined and extending backwardly in said casing.

3. In a safety breather for aircraft engines of the class described, a Venturi casing secured on the aircraft facing the direction of flight of said aircraft provided with an oppositely diverging walled channel therein, a nozzle member secured centrally therein at its front portion with its outlet extending backwardly, a conductor communicating with said nozzle and with the interior of the crank case of the engine, a regulating member positioned in the outlet of said nozzle, said regulating member being stream-lined and extending backwardly in said casing, and valve means communicating with the atmosphere in the conducting means between said nozzle and said crank case.

4. In a safety breather for aircraft engines of the class described, a Venturi casing secured on the aircraft facing the direction of flight of said aircraft provided with an oppositely diverging walled channel therein, a nozzle member secured centrally therein at its front portion with its outlet extending backwardly, a conductor communicating with said nozzle and with the interior of the crank case of the engine, a regulating member positioned in the outlet of said nozzle, said regulating member being stream-lined and extending backwardly in said casing, valve means communicating with the atmosphere in the conducting means between said nozzle and said crank case, and means for readily securing said Venturi casing on an aircraft.

LLOYD C. SLINE.